US005767869A

United States Patent [19]

Saito

[11] Patent Number: 5,767,869

[45] Date of Patent: Jun. 16, 1998

[54] PROGRAM SETTING APPARATUS FOR TIME RECORDER

[75] Inventor: Mituru Saito, Yokohama, Japan

[73] Assignee: Amano Corporation, Kanagawa-ken, Japan

[21] Appl. No.: 408,568

[22] Filed: Mar. 22, 1995

[30] Foreign Application Priority Data

Mar. 28, 1994 [JP] Japan .................................... 6-080919

[51] Int. Cl.$^6$ .......................... G01D 15/04; G01D 15/20

[52] U.S. Cl. .............................................................. 346/82

[58] Field of Search ........................ 346/82, 80; 235/380, 235/377, 494, 470, 50 A; 283/37, 904

[56] References Cited

FOREIGN PATENT DOCUMENTS 62-125972 10/1987 Japan .

62-205490 10/1987 Japan .

2254292 10/1992 United Kingdom .

*Primary Examiner*—Benjamin R. Fuller

*Assistant Examiner*—L. Anderson

*Attorney, Agent, or Firm*—Watson Cole Stevens Davis, P.L.L.C.

[57] ABSTRACT

A printer 7 mounted on a time recorder 1 is provided with a read sensor 10 including a function for determining whether the inserted card is a program setting card or a time card T, a function for reading a program marked on an inserted card when said inserted card is a setting card P, and a function capable of reading an ID code of the card user from a mark TM which is marked in said number of days indicating column TS of the inserted time card when said inserted time card is the time card T.

3 Claims, 15 Drawing Sheets

1PS

| | |
|---|---|
| UNIT TIME (MIN) | TIME UNIT (ROUND TIME) AT TIME OF TABULATION IS MARKED |
| TIME FOR STARTING ON-TIME ATTENDANCE (CHECK-IN) | ANY CHECK-IN FROM THIS TIME TILL TIME FOR STARTING WORK IS REGARDED AS ON-TIME ATTENDANCE (CHECK-IN) |
| FIXED-TIME FOR STARTING WORK, FIXED-TIME FOR ENDING WORK | TIME FOR STARTING AND ENDING WORK IN A FIXED-TIME ZONE ARE MARKED |
| TIME FOR ENDING ON-TIME LEAVE (CHECK-OUT) | ANY CHECK-OUT FROM THE TIME FOR ENDING WORK TILL THIS TIME IS REGARDED AS ON-TIME LEAVE (CHECK-OUT) |
| TIME FOR STARTING LATE NIGHT, TIME FOR ENDING LATE NIGHT | TIME FOR STARTING AND ENDING LATE NIGHT TIME ZONE ARE MARKED |

Fig.5A

PROGRAM SETTING APPARATUS FOR TIME RECORDER

BACKGROUND OF THE INVENTION

1. Field of the Invention

This invention relates to a program setting apparatus for a time recorder, which is capable of easily setting/registering various kinds of programs (parameters), such as setting an inside clock of a time recorder and setting time announcement.

2. Brief Description of the Prior Art

In an electronic type time recorder having a micro computer located in its control unit, various kinds of time processing are executed in accordance with a time recorder-specific system program which is already stored in a memory at the time of exfactory, and a user-specific setting program (setting data) which is supposedly written in the memory by the user after the time recorder is purchased. Among those programs, with respect to the user-specific setting program, it is a usual practice that a service man or the like writes the program in the memory through operation of a keyboard of the time recorder while seeing a program sheet carefully prepared so as to represent the user's working status.

However, various kinds of patterns exist in the user-specific program depending on difference in working system or in print control system. In addition, there can be recognized differences in working pattern even in a same company, if working sections or working departments of employees are different and if branch offices of the employees are different. Therefore, such inconveniences are encountered that it is very troublesome to prepare such a program itself and it is extremely troublesome to correctly input such a complicated program through the keyboard while seeing the program. Consequently, it is often happened that even a long-experienced service man makes mistakes during the course of typing of such a complicated program.

In view of the above, the present applicant has developed time recorders of the type as disclosed in FIG. 1 of previously-filed Japanese Utility Model Application No. Sho 61-12660 (Japanese Laid-Open Utility Model Application No. Sho 62-125972) or in FIG. 4 of previously-filed Japanese Laid-Open Patent Application No. Sho 62-205490, in which a program is prepared using a program setting card of a mark sheet type having many mark marking columns, and this setting card is inserted into the time recorder to allow a mark read sensor to read the program, so that the setting program is automatically input into the memory.

However, in the case where a setting card thus constructed is used, it is necessary to provide many mark read sensors on the side of the time recorder in such a manner as to correspond to the digit number of the marking columns. Accordingly, the time recorder becomes complicated in structure to the extent of the number of those sensors. Moreover, since it is required that the mark read sensors read all the mark marking columns of a multi-stage structure, column-by-column, it takes a long time to read the program.

The present invention has been accomplished in view of the above situation.

SUMMARY OF THE INVENTION

It is, therefore, an object of the present invention to provide a program setting apparatus for a time recorder which is capable of reading a setting program which is written in each marking column of the setting card in accordance with a mark sheet system or method by a single number of read sensor, and which is capable of reducing the time required for reading the setting program as much as possible.

To achieve the above object, the present invention employs the following means.

In a program setting apparatus for a time recorder in which various kinds of time-related data are printed on a time card by a printer in accordance with a system program prestored in a memory and also with a user-specific setting program which is written in the time card after the time recorder is purchased, the program setting apparatus comprises:

(1) a program setting card having an identical configuration to that of the time card, a plurality of timing marks which are printed, side-by-side, on one side edge of the time card in a vertical feeding direction, program setting mark marking columns (which may alternatively be known as mark making columns) being provided in a lateral direction of the timing marks, respectively, and a time recorder including a sensor mounted on the printer and adapted to read both the timing marks and setting programs which are respectively printed and marked on the one side edge and in the mark marking columns of the setting card, program read means for controllably rotating a card transfer motor and a printer motor to cause the printer to move laterally, column-by-column, along the mark marking columns while transferring, line-by-line, the setting card, so that the sensor can read the setting program which is marked in each mark marking column, and storage means for writing the setting program thus read into the memory.

(2) The uppermost line of the mark marking columns formed on the setting card is served as an identification code column in which an identification code is preliminarily printed or marked, and the time recorder include identification code read means for controlling, when the sensor mounted on the printer has read the timing mark which is marked on the setting card, the card transfer card and the printer motor, to cause the sensor to read the identification code which is printed or marked in the identification code column on the uppermost line, and program read control means for controlling the card transfer motor and the printer motor so that the sensor reads the setting program only with respect to the particular mark marking column which is related to the identification code, in accordance with the identification code thus read.

(3) The card is provided with a setting mode confirming column in which the setting programs read by the sensor are printed item-by-item, and the time recorder is provided with program printing means for actuating the printer to print, item-by-item, the content of the setting program read by the sensor in the setting mode confirming column of the setting card.

(4) A mark read sensor mounted on the printer is provided with a code determination function for reading a mark which is marked in the number of days indicating column of the inserted time card and determining the number of days indicated in the number of days indicating column in which the mark is marked, as an ID code of the card user, a back mark read sensor provided likewise with a code determination function being mounted on a back side of a guide path for the time card.

The respective means mentioned with respect to (1), (2), (3) and (4) function as follows.

According to the means mentioned with respect to the above (1), for inputting a program, the program prepared by marking the mark marking column in accordance with a mark sheet system may simply be inserted directly into the time recorder. When the time recorder reads a timing mark from the inserted timing card, it causes the printer to move laterally per each mark marking column while feeding the setting card line by line, so that the mark (i.e., setting program), which is marked in each mark marking column, is read by the read sensor mounted on the printer. With the foregoing feature, since it is enough to provide only one read sensor on the time recorder, the time recorder can be simplified to that extent.

According to the means mentioned with respect to the above (2), the time recorder reads the identification code from the inserted setting card first and then causes the read sensor mounted on the printer to read the mark, i.e., setting program, only with respect to the particular mark marking column which is related to the identification code thus read. Accordingly, it becomes possible to shorten the time required for reading the program as much as possible.

According to the means mentioned with respect to the above (3), the content of the setting program which the read sensor has read from the mark marking column of the setting card can be output, item-by-item, to the setting mode confirming column provided on the setting card. Accordingly, the content of the setting program which has been written in the memory of the time recorder using the setting card, as well as the correctness of the content, can be directly confirmed by seeing this setting mode confirming column.

According to the means mentioned with respect to the above (4), when the timing card is inserted, by causing the mark read sensor mounted on the printer to read the mark which is marked in the number of days indicating column of the time card, the calculated working data can be recorded in the file of each employee stored in the data memory by way of reading the ID code of the card user. Even if the time card is inserted into the time recorder with its back side up due to switching of the number of days, the ID code of the card user, i.e., mark in the number of days indicating column, can be read by the back read sensor. Also, the mark which is marked in the number of days indicating column on the back side can be read by this back mark read sensor.

The above and other objects, characteristic features and advantages of the present invention will become more apparent to those skilled in the art by the following description of the preferred embodiment of the invention, as illustrated in the accompanying drawings.

BRIEF DESCRIPTION OF THE DRAWING

FIG. 5A is an explanatory view showing specific contents of an explanation column of FIG. 5;

DETAILED DESCRIPTION OF THE EMBODIMENT

One preferred embodiment of a program setting apparatus for a time recorder according to the present invention will be described in great detail with reference to the accompanying drawings.

Figure 1:
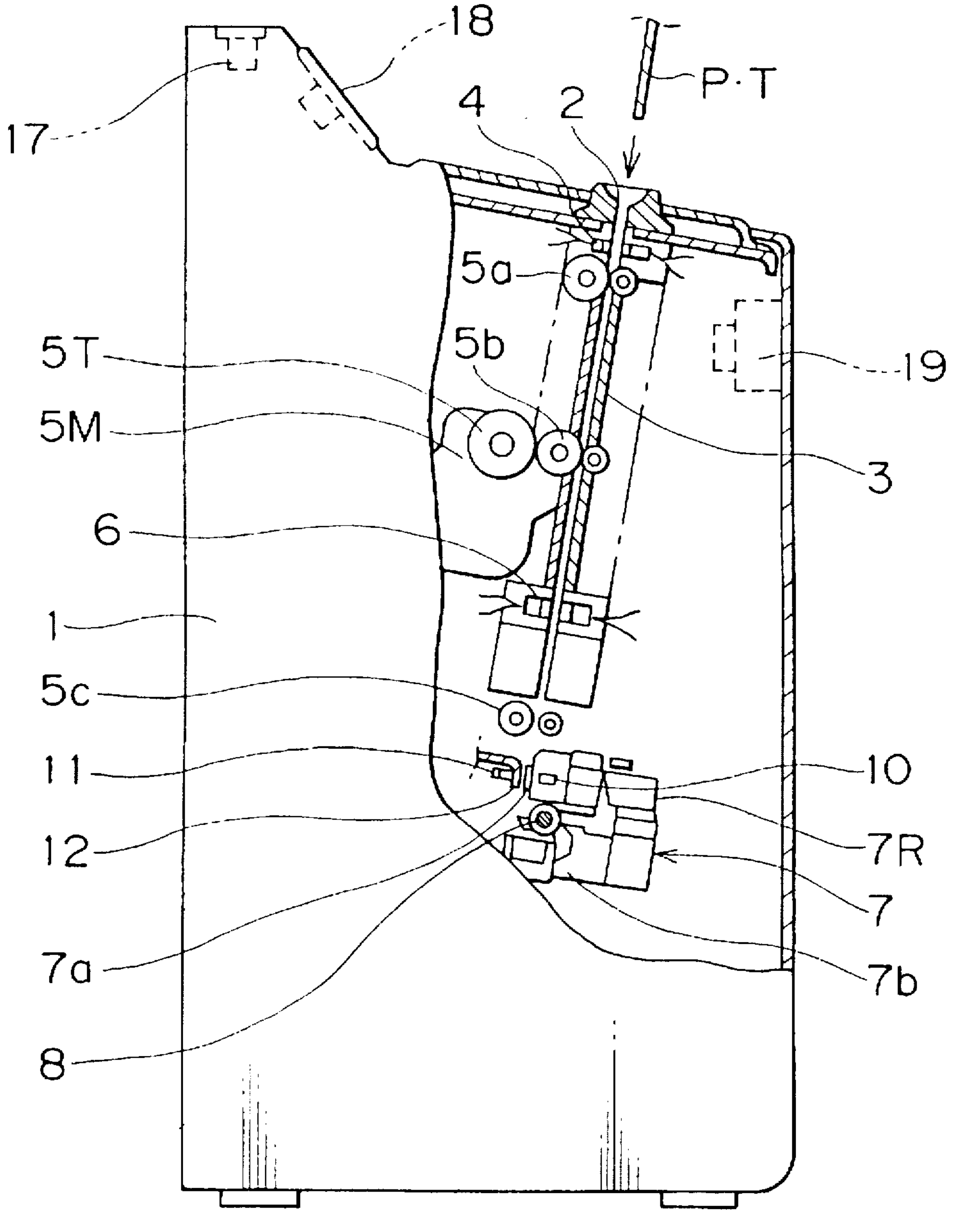
FIG. 1 is a side sectional view for explaining an internal structure of a time recorder equipped with a program setting apparatus according to one embodiment of the present invention.

FIG. 1 is a partly sectional side view of a time recorder equipped with a program setting apparatus according to the present invention. In the drawing, reference numeral 1 denotes a time recorder; 2, an insertion slit for a time card T (see FIG. 7) and a setting card P (see FIGS. 5 and 6); 3, a card guide; 4, a card detection sensor provided on an upper end portion of the card guide 3; 5a, 5b, 5c, card feed rollers rotated in operative connection with a card feed motor 5M and a driving gear 5T; 6, a front/back discrimination sensor for discriminating the front from the back of the card by reading a front/back discrimination cutout TX formed in a lower edge of the time card T as shown in FIG. 7; and 7, a dot printer located at a lower end portion of the card guide 3, respectively.

Figure 2:
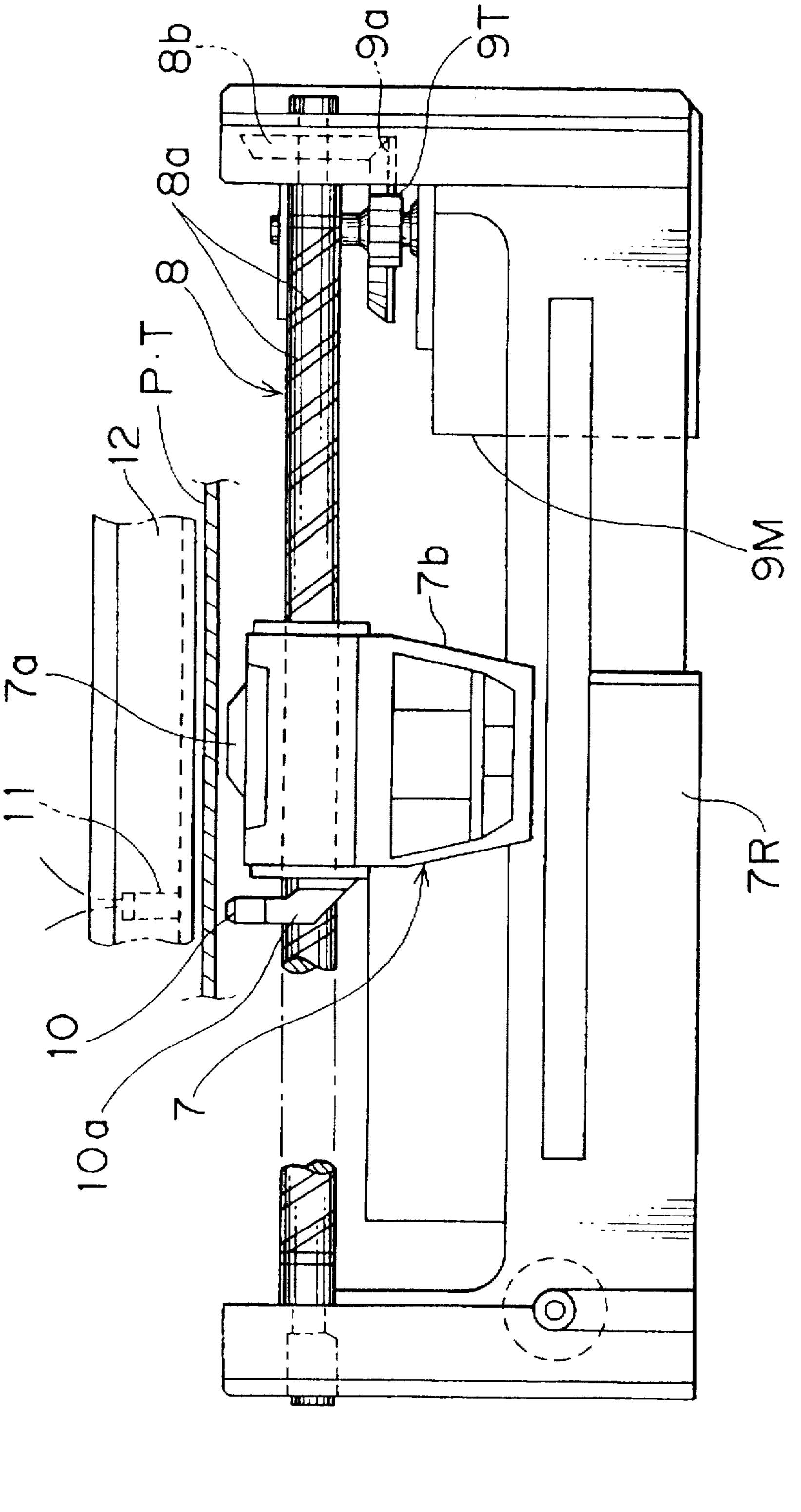
FIG. 2 is a plan view for explaining an important portion of the time recorder of FIG. 1.
Figure 3:
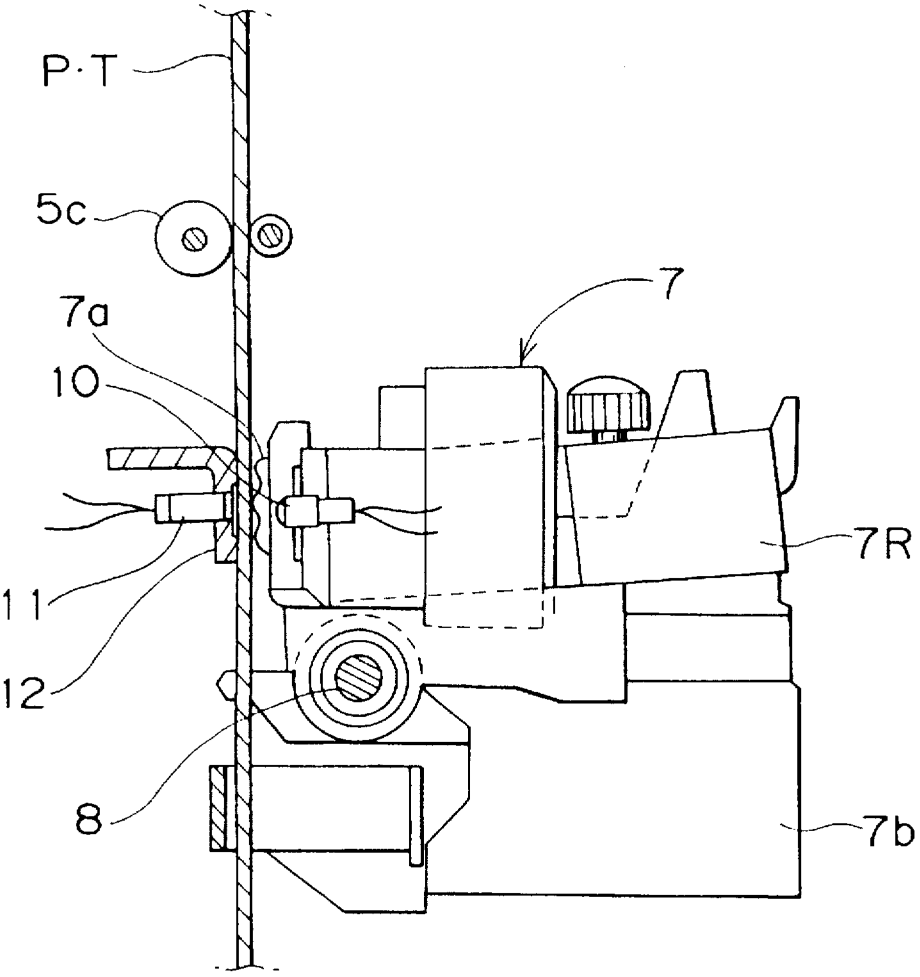
FIG. 3 is a side sectional view of an important portion of the time recorder of FIG. 1.

As shown in a plan view of FIG. 2 and a side sectional view of FIG. 3, the dot printer 7 comprises a carrier 7b on which this printer 7 is loaded, and a ribbon case 7R. The dot printer 7 is operated to print working data in a predetermined printing column TA of the time card T which has been delivered between a head 7a and a platen 12, and also print, item-by-item, the contents of a set program in a setting mode confirming column PD (see FIGS. 5 and 6) which is formed on a lower portion of the program setting card P which has been delivered likewise between the head 7a and the platen 12.

In the above drawing, reference numeral 8 denotes a cam shaft for laterally moving the dot printer 7. When a motor 9M is actuated, a driving gear 9T is rotated. In response to the rotation of the driving gear 9T, a bevel gears 9a and 8b are rotated to cause the cam shaft 8 to rotate. By bringing a guide pin (not shown) projecting from a bottom surface of the carrier 7b into a cam groove 8a cut in a peripheral surface of the cam shaft 8, the dot printer 7 is moved axially and laterally.

Likewise, in the above-mentioned respective Figures, reference numeral 10 denotes a mark read sensor which is mounted on a side portion of the dot printer 7 using a mounting arm 10a. This sensor 10 is operated to read a timing mark PT and a program setting mark from the program setting card P shown in FIGS. 5 and 6, and also read an ID code setting mark TM which is marked in a "number of days" indicating column TS, from the time card T shown in FIG. 7. This will be described in more detail later.

Figure 4:
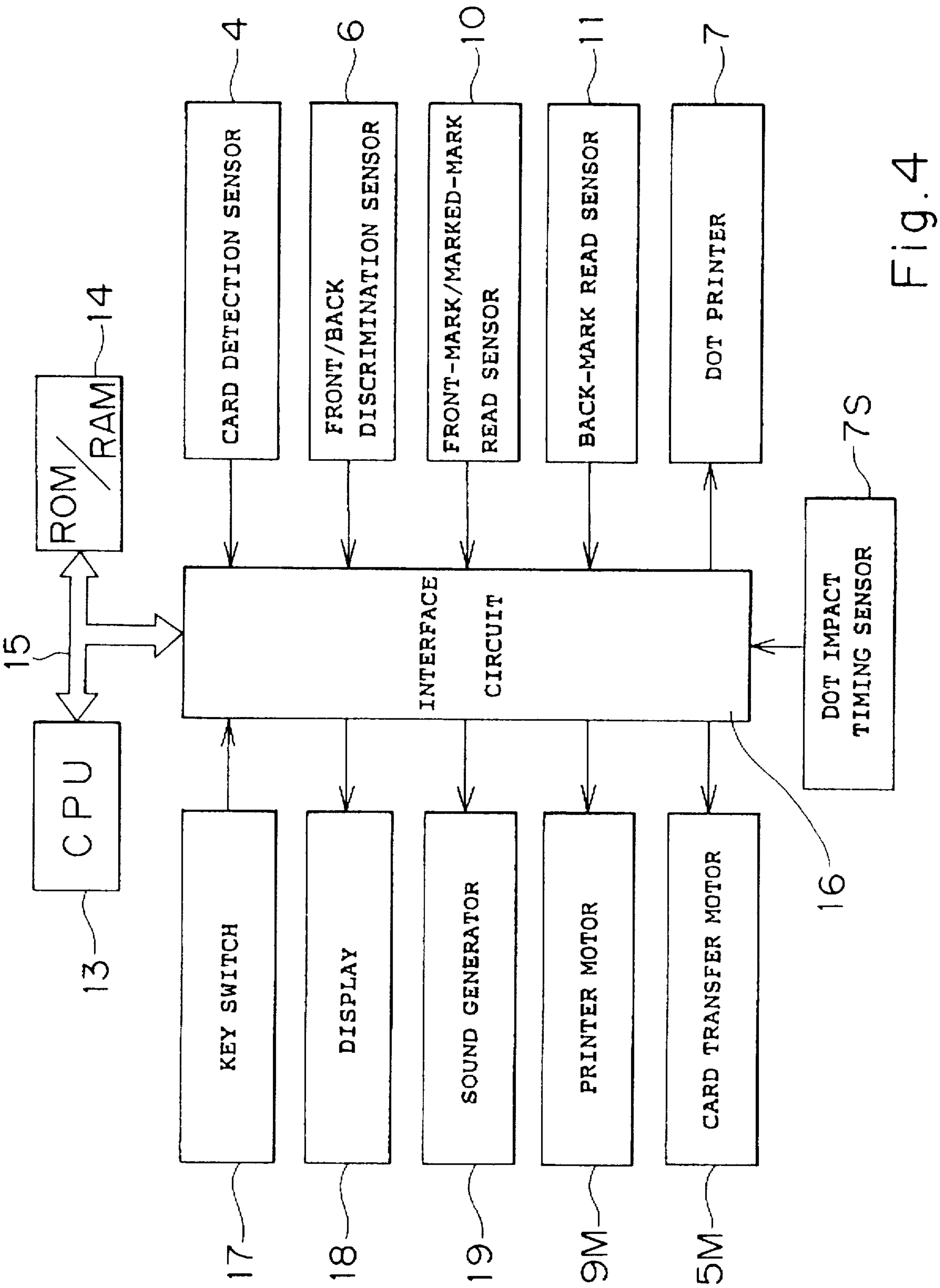
FIG. 4 is a block diagram for explaining an electrical structure of the present invention.

FIG. 4 is a block diagram showing an electric construction of the above-mentioned present invention. In the drawing, reference numeral 13 denotes a CPU; 14, a memory consisting of a ROM and a RAM; and 16, an interface circuit which is connected between the CPM 13 and the memory 14 through a bus 15, respectively. The card detection sensor 4, the card feed motor 5M, the card front/back discrimination sensor 6, the dot printer 7, a dot impact timing sensor 7S, the printer moving motor 9M, the mark read sensor 10, a back mark read sensor 11, a mode selector key switch 17, a display 18, and a sound generator 19 for producing an NG alarm sound, are all connected to the interface circuit 16. Also, a clock circuit (not shown) for outputting a reference clock signal is further connected to the interface circuit 16. Those devices are all controllably operated in accordance with a system program stored in the memory 14 and also with a setting program as later described.

Figure 5:
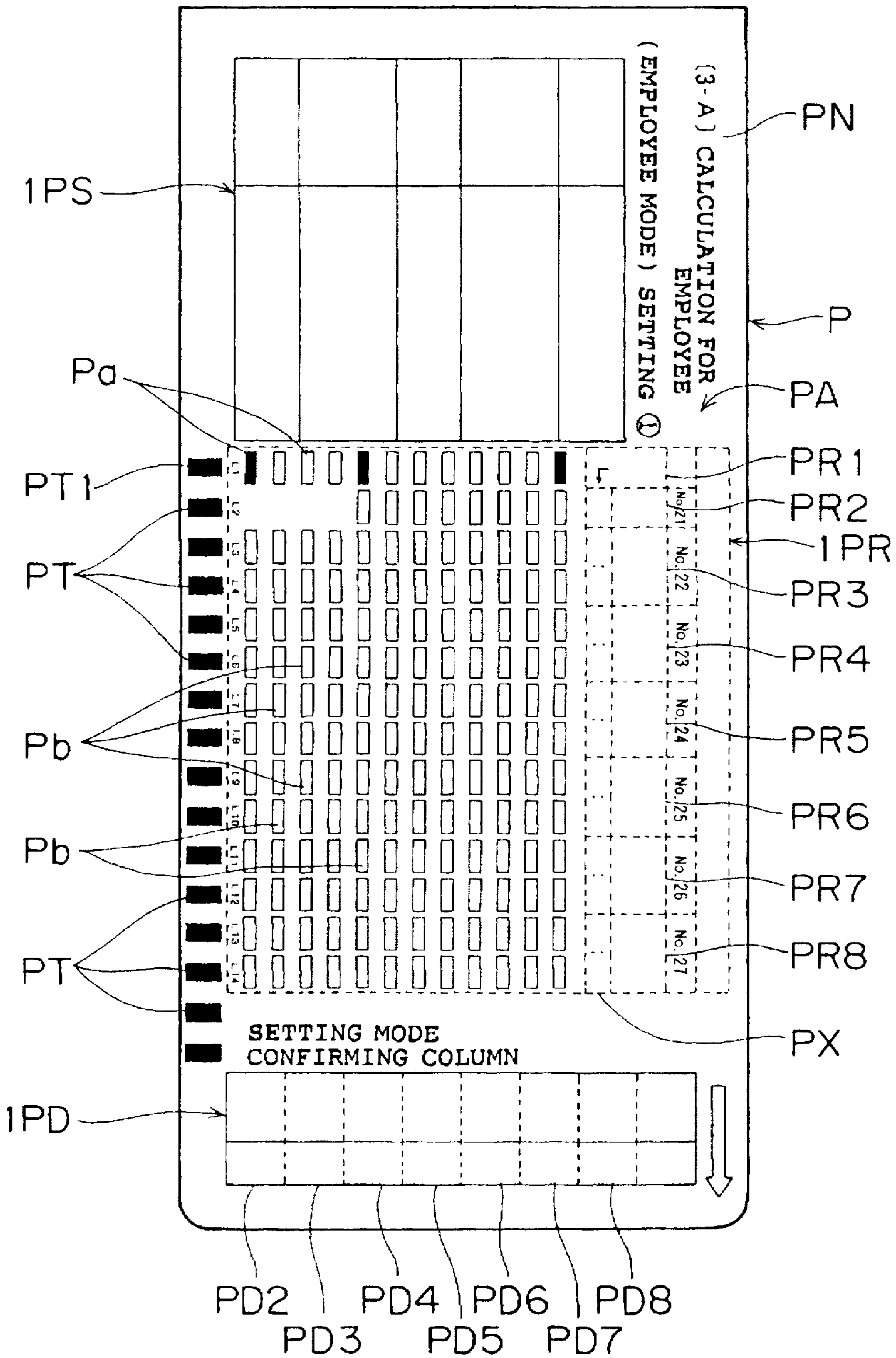
FIG. 5 is a surface view showing one example of a program setting card to be used in the present invention.
Figure 6:
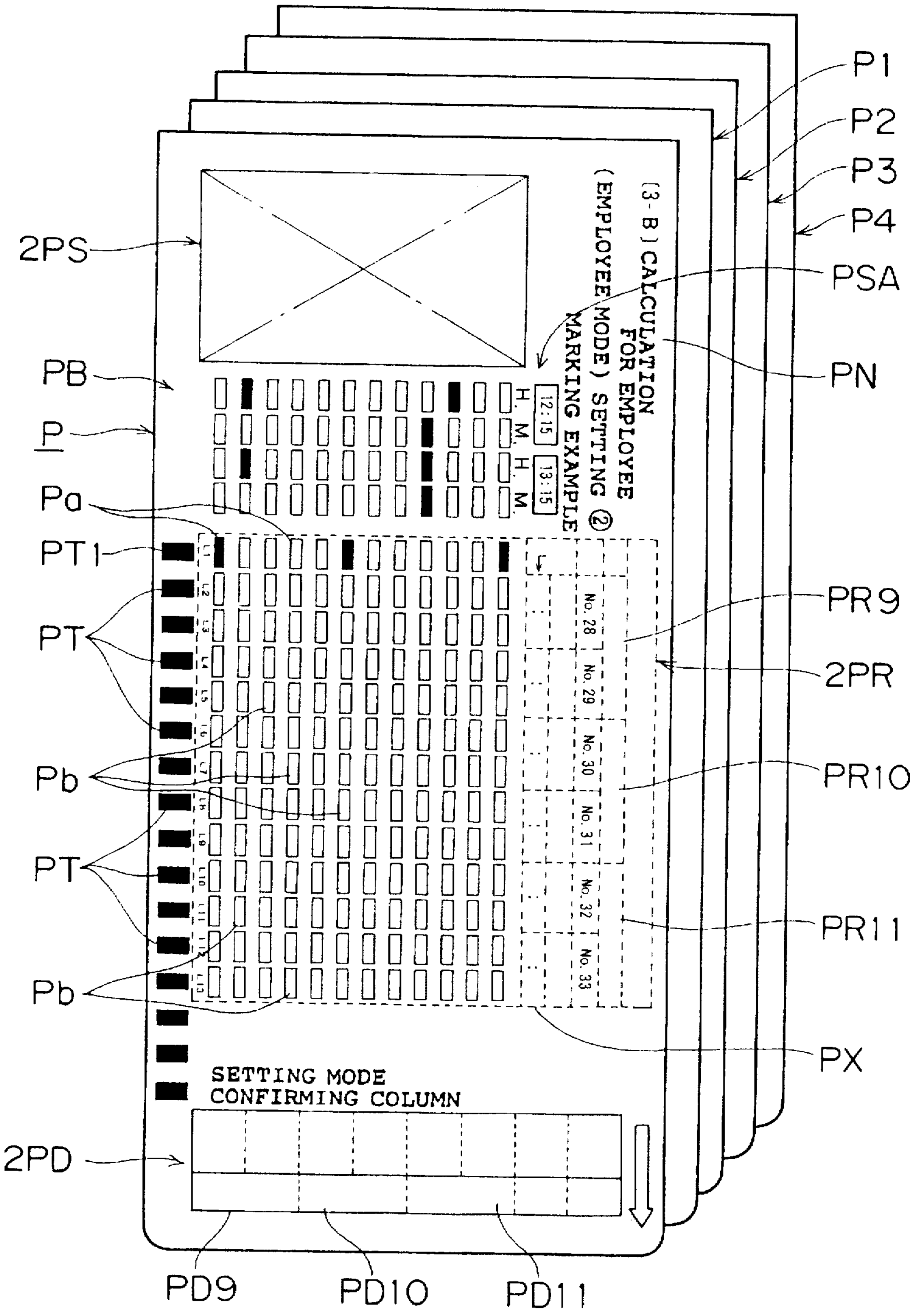
FIG. 6 is a back view of the setting card shown in FIG. 5.
Figure 7:
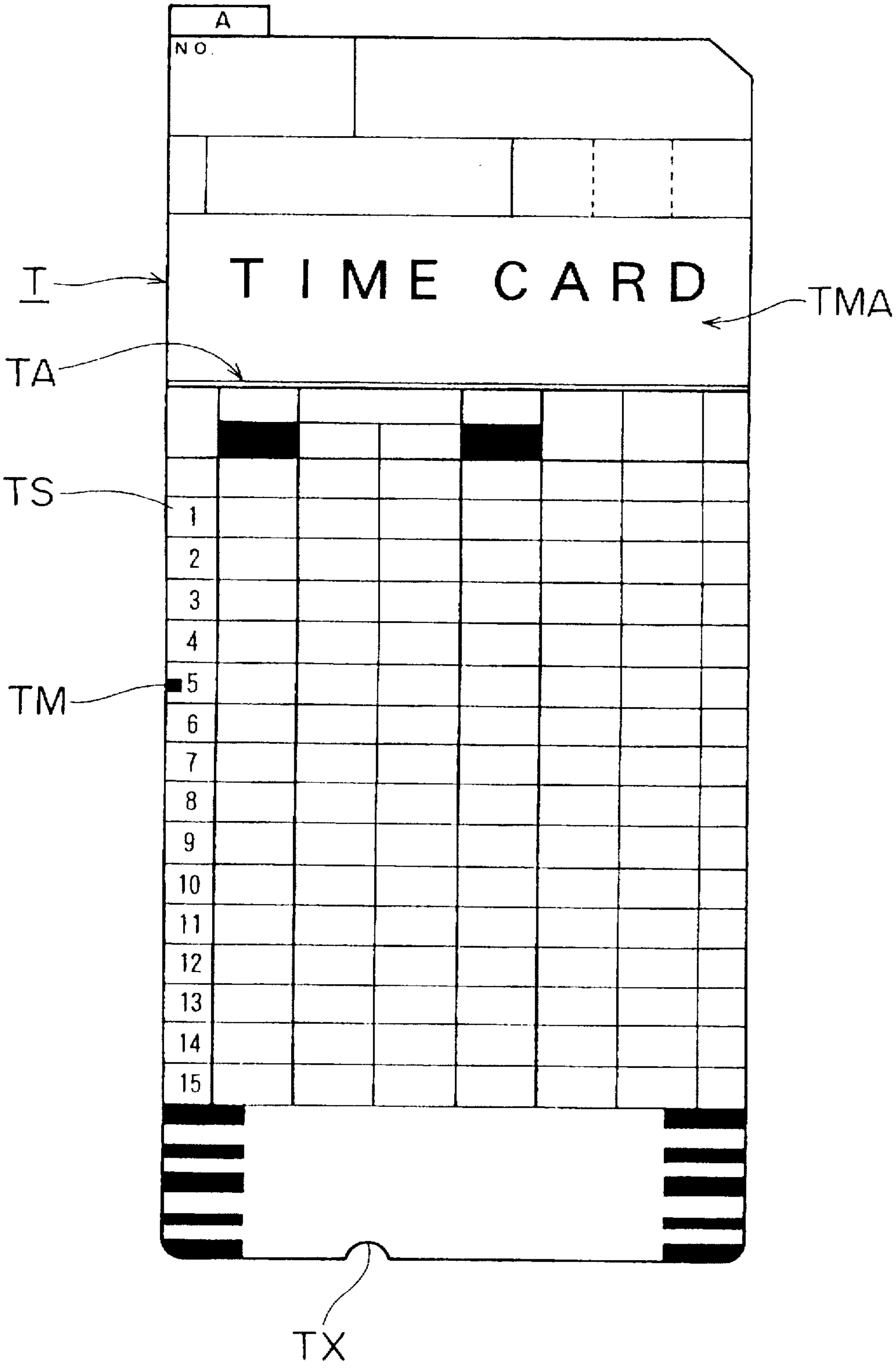
FIG. 7 is a front view of a time card to be used in the present invention.

FIGS. 5 and 6 are a surface (front) and a back view showing the surface (front side) PA and the back (back side) PB of the program setting card P having an identical configuration to that of the above-mentioned time card T. The card shown in these Figures is only one example among many program setting cards P. Specifically, this setting card P is an employee mode setting card for setting unit time, time for starting on-time attendance (check-in), fixed-time for starting work, fixed-time for ending work, time for ending on-time leave (check-out), time for starting late night, and time for ending late night. Examples of other setting cards include a side-job mode setting card P1 for setting a working time zone for side-job, melody/time announcement setting cards P2 and P3, and a common setting card P4 (see FIG. 6) for setting common matters such as closing day, printing line switching time, etc. Any of those cards can set a user-specific program prepared in accordance with a mark sheet system or method in the memory 14 of the time recorder 1.

In FIGS. 5 and 6, PT . . . denote sixteen, in total, timing marks printed on one side edge of the setting card P with a predetermined space formed in the up and down or vertical direction. When the mark read sensor 10 mounted on the printer 7 reads this mark or marks from the inserted card, the time recorder 1 can recognize that the inserted card is the program setting card P. In contrast, when the mark read sensor 10 fails to read the timing mark PT from the inserted card, the time recorder 1 can recognize that the inserted card is the time card T. Thereafter, either the program setting routine or the working data recording routine is executed.

Figure 5B:
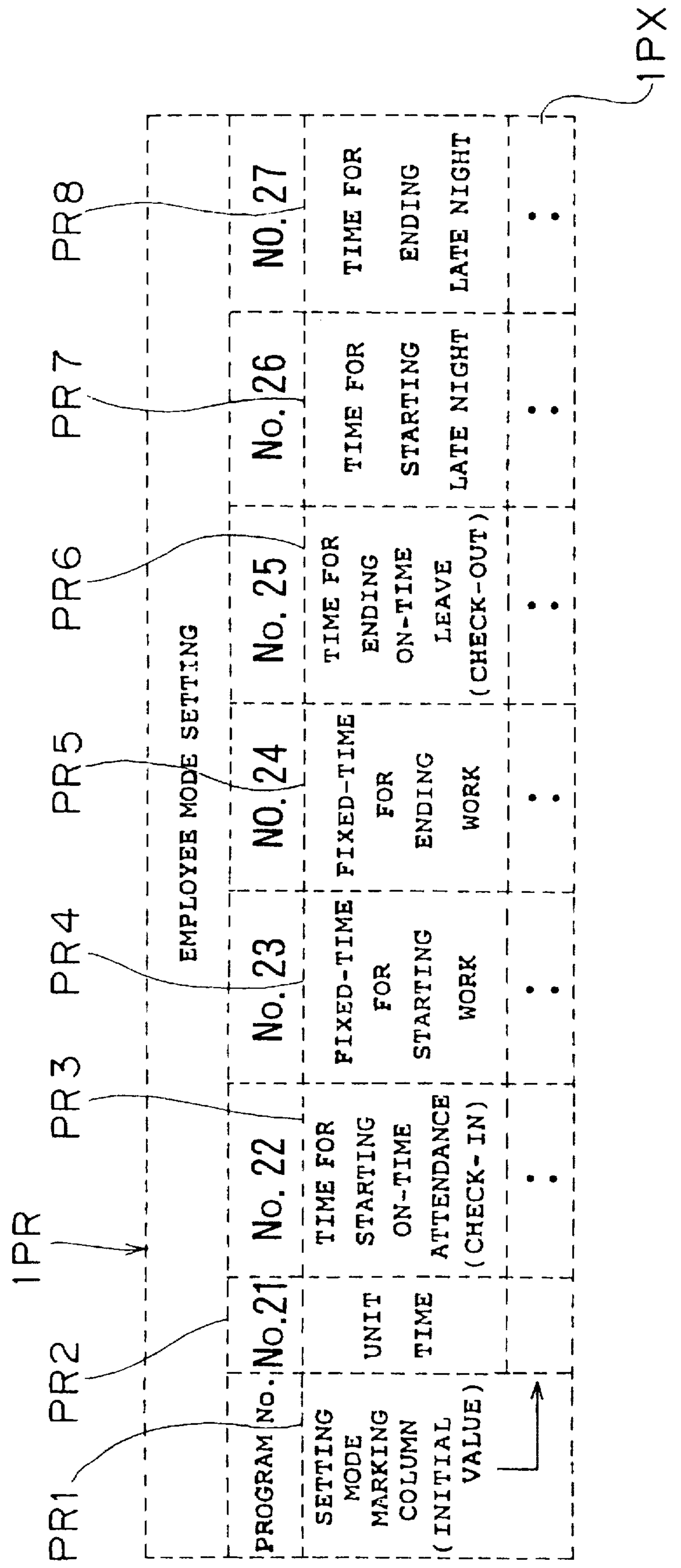
FIG. 5B is an explanatory view showing specific contents of an employee mode setting item column of FIG. 5.
Figure 6A:
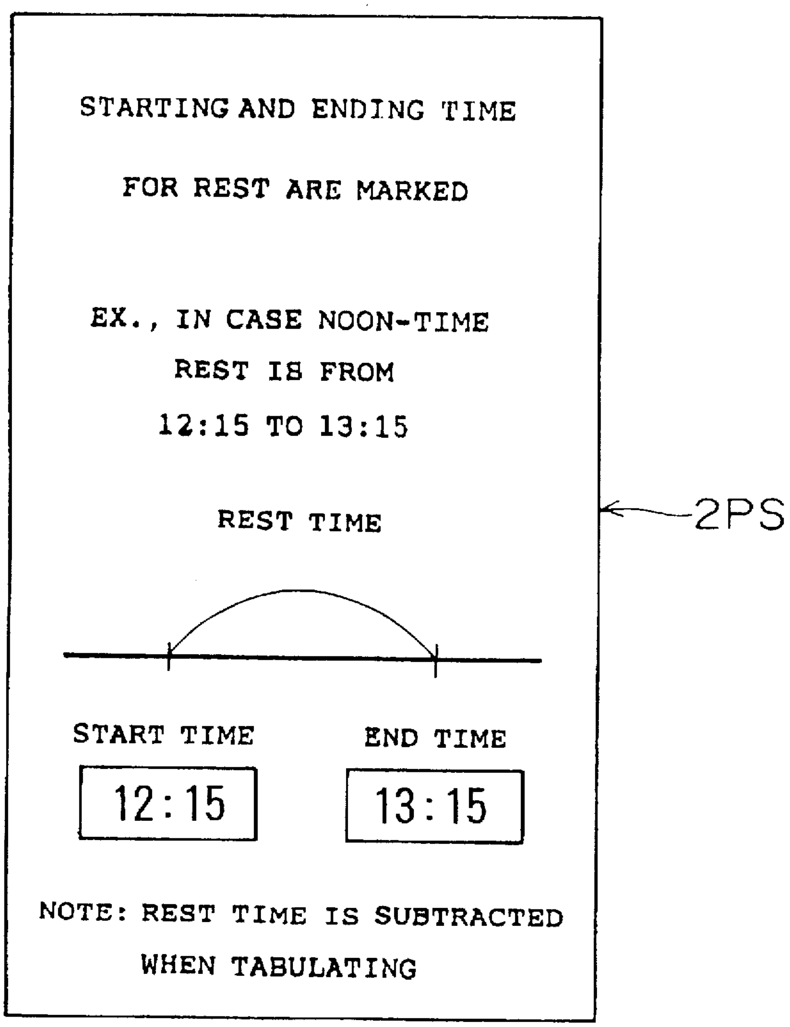
FIG. 6A is an explanatory view showing specific contents of a marking example of FIG. 6.
Figure 6B:
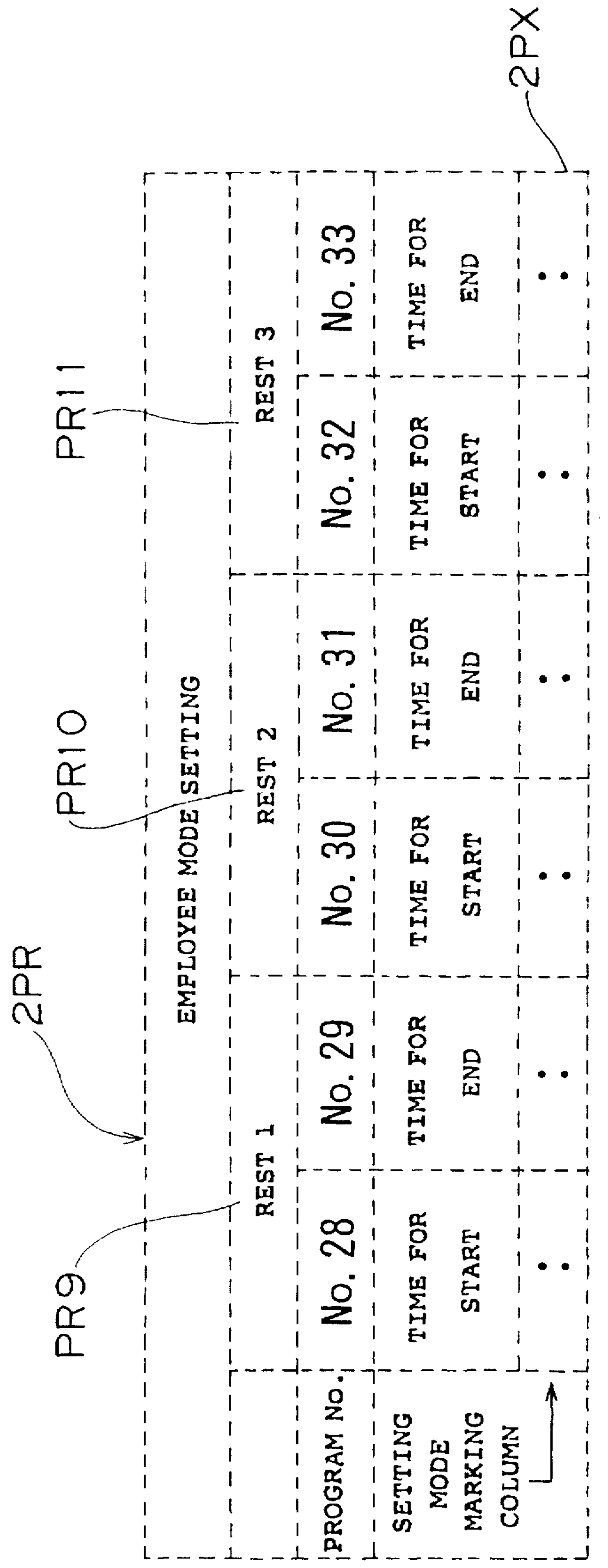
FIG. 6B is an explanatory view showing specific contents of the employee mode setting item column of FIG. 6.

Similarly, in FIGS. 5 and 6, Pb . . . denote mark marking columns which are printed, side-by-side, laterally of each of the above mentioned timing marks PT . . . ; Pa, an identification code column (or discrimination code column) formed on the uppermost column of the timing card PT and in which the identification code of the setting card P is printed or marked; 1PR and 2PR, employee mode setting item column in which various program setting items PR1 to PR11 are printed per this identification code column Pa and per each mark marking column Pb as shown in FIG. 5B and 6B; 1PX and 2PX, initial value indicating columns provided per each setting item PR1 to PR11; PN, a tile of this setting card P; 1PS, an explanation column in which the item (program) set by the setting column P is indicated in the surface view of FIG. 5, and 5A shows specific details thereof.

Further, PSA shown in the back view of FIG. 6, is one marking example when a setting program for the starting and ending time for rest is marked in the above-mentioned mark marking columns Pb . . . , and 2PS is an explanatory view (see FIG. 6A for specific details) thereof. In the present invention, as apparent from this marking example PSA and the explanatory view 2PS, program can be set for each setting item PR1 to PR11 by marking the mark marking columns Pb . . . which are provided for each setting item PR1 to PR11, in accordance with the mark sheet system or method.

Also, in the time recorder 1 used in the present invention, when the mark reach sensor 10 mounted on the printer 7 reads the timing marks PT . . . from the inserted program setting card P, it controls the card transfer motor 5M to withdrawn this setting card P to the position of the uppermost line PT1 of the mark marking columns Pb first and then, it controls the printer motor 9M to move the printer 7 laterally to cause the sensor 10 to read the identification code which is printed or marked in the identification code column Pa. After reading the identification code, the sensor 10 is caused to read the timing marks PT one after another and at the same time, the card transfer motor 5M is controlled to transfer the setting card P line by line and the printer 7 is moved laterally at each mark marking column Pb . . . which is related to the identification code read from the identification code column Pa, so that the setting program marked in the setting columns Pb . . . is read and written in the memory 14 one after another.

An input example of the setting program will be further described with reference to FIGS. 6 and 6B. For example, in the event that an identification code representative of "rest 1" is input in the identification code column Pa of the uppermost line PT1, the printer 7 is moved laterally at the second, third, fourth, and fifth lines of the timing marks PT . . . , so that the sensor 10 can read the setting program which is related to the "rest 1". However, at the remaining lines, the printer 7 is not moved laterally and the sensor 10 is not caused to read the setting program. Instead, the setting card P is transferred, line by line, to the position of a setting mode confirming column as later described.

Figure 5C:
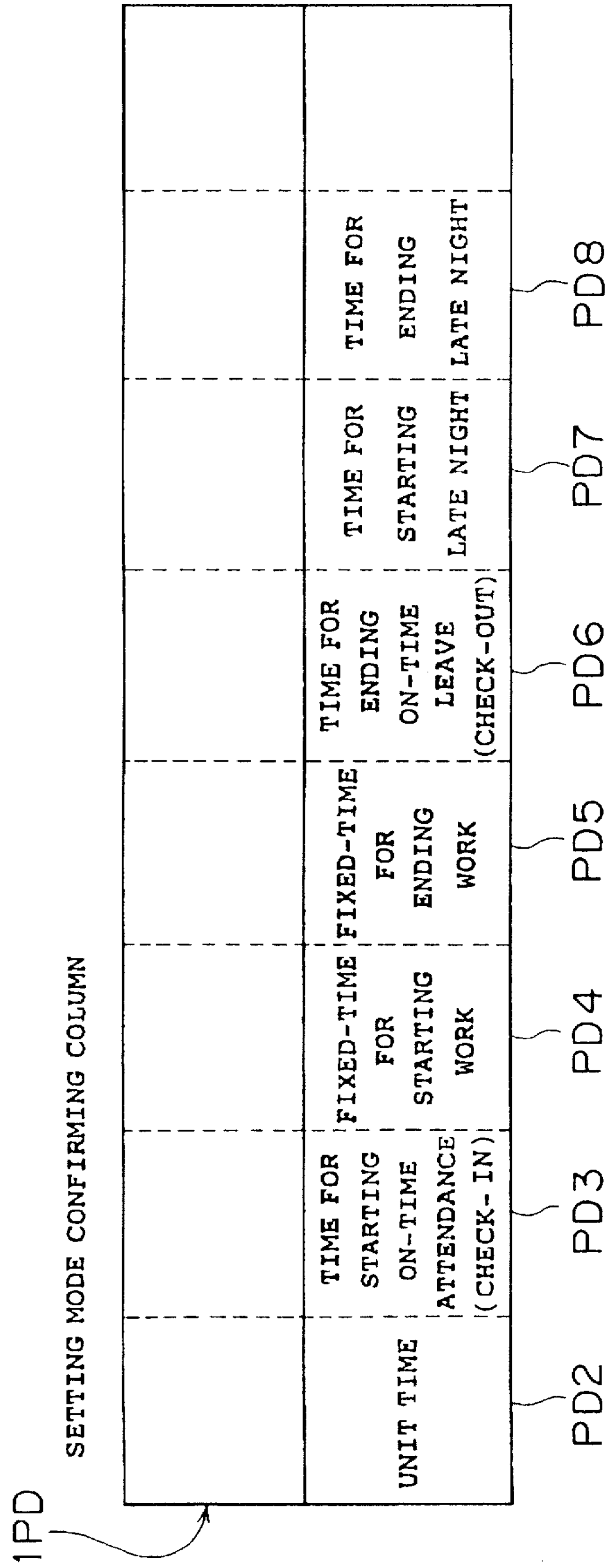
FIG. 5C is an explanatory view showing specific contents of setting mode confirming column.
Figure 6C:
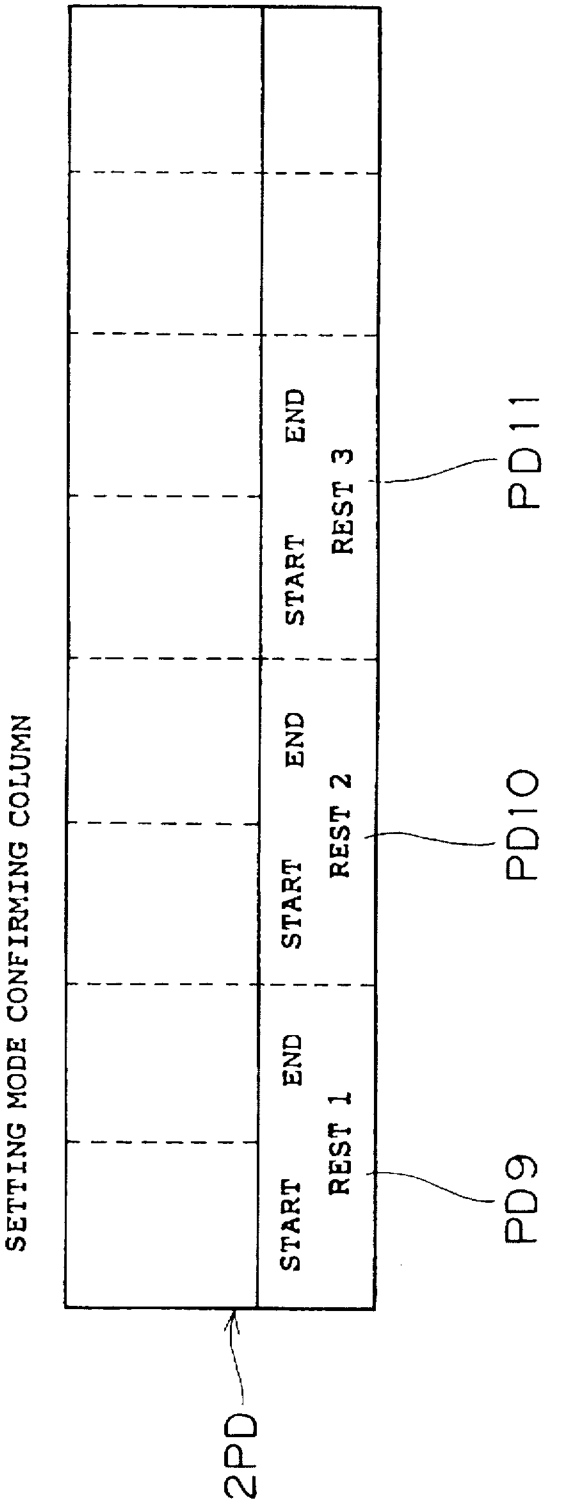
FIG. 6C is an explanatory view showing specific contents of the setting confirming column of FIG. 6.

In FIGS. 5 and 6, 1PD and 2PD denote setting mode confirming columns which are printed on the lower portion of the setting card P. In the confirming columns 1PD and 2PD, as illustrated in FIGS. 5C and 6C respectively, there are provided the printing columns PD2 to PD11 in which identical items to the above-mentioned setting items PR2 to PR11 are indicated. In these printing columns PD2 to PD11, the program, which the sensor 10 has read from the mark marking columns Pb . . . , actuates the printer 7 so that the printer 7 prints concrete numerical figures or letters for each item.

In the time card T shown in FIG. 7, TMA denotes a marking column in which such data as date of use, name, department, etc.; TA, a working data printing column; TS, the number of days indicating column; and TM, a mark marking the number of days portion in any one of the number of days indicating column. In the present invention, when the time card T is inserted in the time recorder 1, the sensor 10 mounted on the printer 7 reads this mark TM and determines the marked number of days as an ID code of the card user. On the other hand, the calculated working data is printed in the particular column of the printing column TA using the printer 7 and this working data is stored in the file corresponding to the ID code in the memory 14.

In FIGS. 1 to 3, reference numeral 11 denotes a back mark read sensor mounted on the platen 12. In the event that the mark TS is indicated in the number of days indicating column on the back side of the inserted time card T, this sensor 11 reads the mark TS and particularly specifies the ID code of the card user.

In the above-mentioned embodiment, the program and ID code are set by marking a mark in each setting card P and time card T. It should be noted, however, that the particular part may of course be punched out or cut out with the same results.

Figure 8:
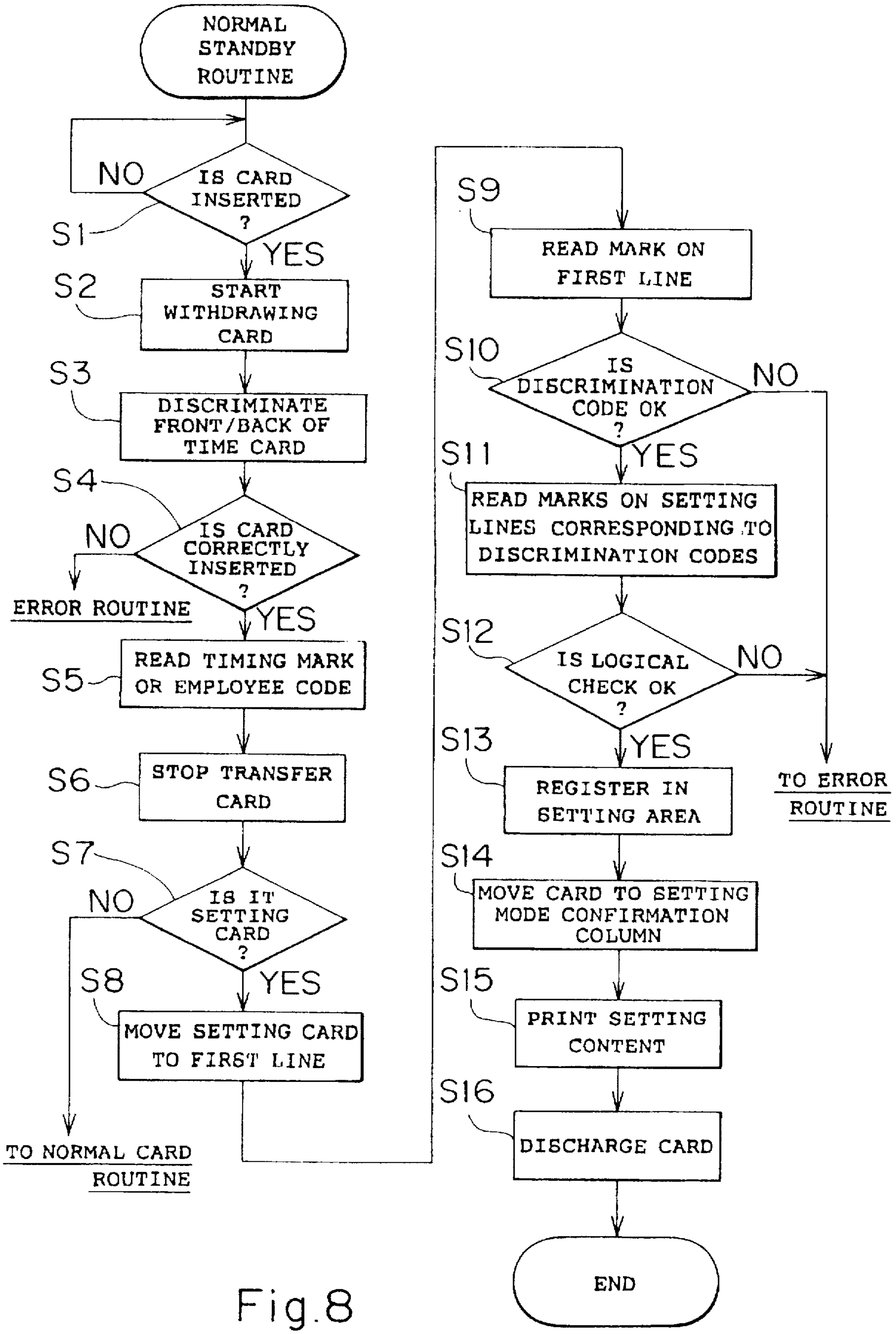
FIG. 8 is a flow chart explaining the processing steps for input setting of a program according to the present invention.

Next, the steps for setting a program according to the present invention will be described with reference to the flowchart shown in FIG. 8.

In the first Step S1, it is judged by the card detection sensor 4 whether or not a card is inserted. If the result of judgment is affirmative, the program proceeds to the next Step S2 where the card is withdrawn by the card transfer motor 5M. Then, it is judged by the front/back discrimination sensor 6 whether or not the inserted card is in the state with its front side up. This front/back judgment is made only to the time card T and no judgment is made to the setting card P. Therefore, in the event that the inserted card is the setting card P, the state is maintained as it is. In contrast, in the event that the inserted card is the time card T, the program proceeds to Step S4 where it is judged whether the posture of the inserted time card T is correct. If the judgment result is negative, such an error processing routine as generation of a error sound and ejection of the card is executed. If the judgment result is affirmative, the program proceeds to Step S5.

In Step S5, in the event that the inserted card is the setting card P, the timing marks PT . . . are read one after another by the mark read sensor 10 mounted on the printer 7. However, in the even that the inserted card is the time card T, the mark TM in the number of days indicating column TS is read by the sensor 10 or back mark read sensor 11 and then the ID code of the card user, i.e., employee code is read. Then, the program proceeds to Step S6 where in the event that the inserted card is the setting card P, the card is stopped being transferred by the card transfer motor 5M at the time point when sixteen, in total, timing marks PT . . . are read, but in the event that the inserted card is the time card T, the card is stopped being transferred by the card transfer motor 5M at the position of the printing column of that day.

Then in the next Step S7, it is judged whether the inserted card is the setting card P or the time card T based on the reading of the timing mark PT performed by the sensor 10. In the event that the inserted card is the timing card T, the program goes to the normal card processing (working data recording routine), but in the event that the inserted card is the setting card P, the program proceeds to Step S8 where the card is transferred such that the sensor 10 is in alignment with the uppermost line PT1. Then, the program proceeds to the next Step S9.

In Step S9, the identification code printed or marked in the first line is read by the sensor 10. Then, in the next Step S10, it is judged whether or not the identification code thus read is correct one. If the judgment result is negative, the aforementioned error processing routine is executed, but if the judgment result is affirmative, the program proceeds to the next Step S11 where both the card transfer motor 5M and printer motor 9M are controlled such that the marked marks are read by the sensor 10 to the extent of the setting number of lines related to the identification code thus read, in other words, reading of the setting program is executed. Then, the program proceeds to Step S12 where a logic checking is executed with respect to the setting program thus read. If the checking result is correct, the program proceeds to Step S13 but if the checking result is wrong, the error processing routine is executed in the manner as mentioned above.

In Step S13, the program read by the sensor 10 is registered in the setting area in the memory 14. Then, the program proceeds to Step S14 where the card transfer motor 5 is controlled such that the setting card P is transferred until the setting mode confirming column PD is in alignment with the printing position of the printer 7. Then, the program proceeds to Step S15 where the content of the setting program read by the sensor 10 is printed in the form of letters or numerical figures in each item printing columns PD2 to PD11. Lastly, the program proceeds to Step S16 where the card is discharged or ejected by the card transfer motor 5M to thereby end the procedure.

Figure 9:
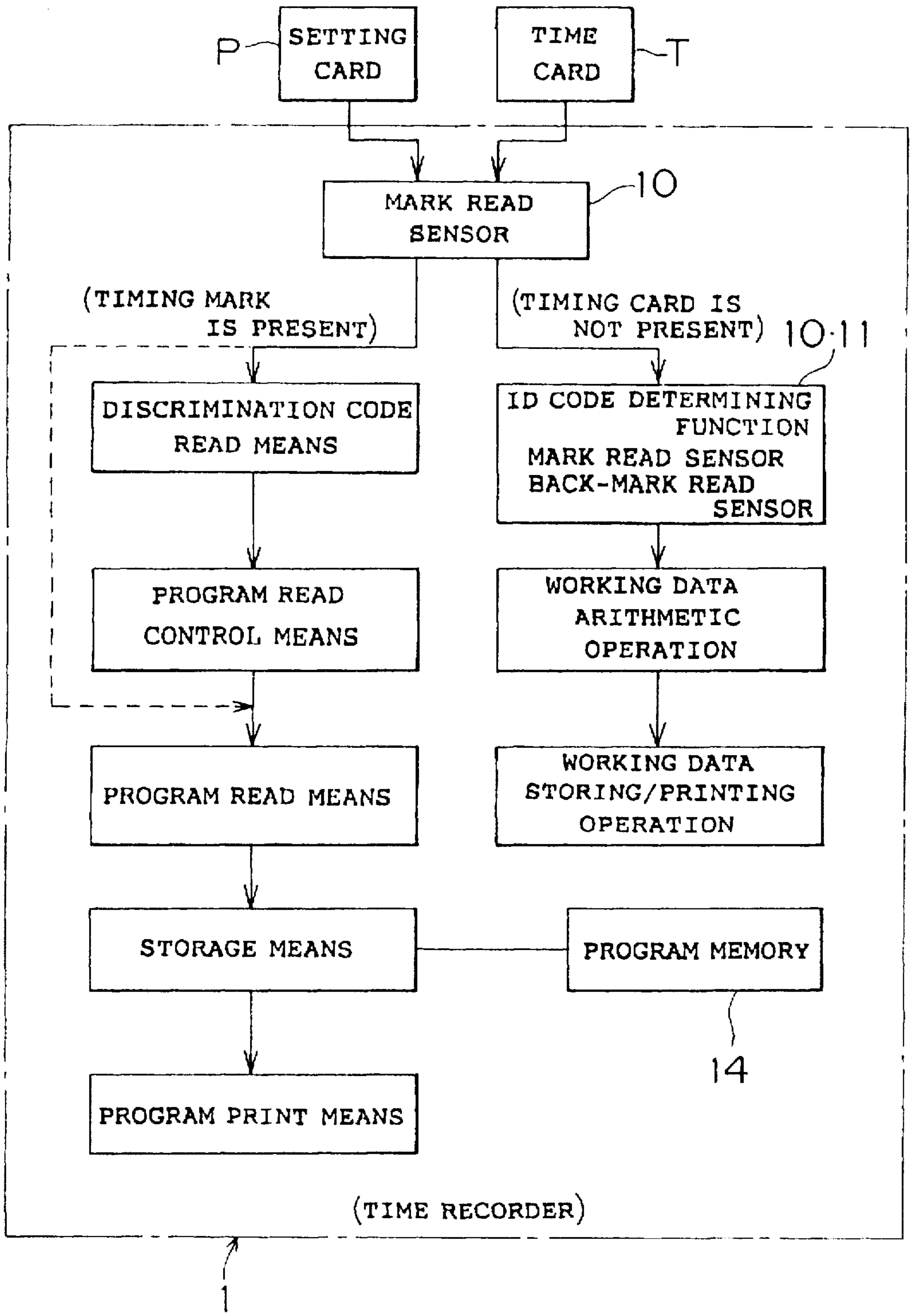
FIG. 9 As a view showing an overall construction of the present invention.

FIG. 9 is a view showing an overall construction of the present invention.

The program setting apparatus for a time recorder according to the present invention is constructed in the manner as mentioned above. Since the setting program marked on the setting card in accordance with the mark sheet method or system can be read by a single number of read sensor mounted on the printer, the time recorder itself can be extensively simplified in structure compared with the conventional time recording in which the setting program is read using many read sensors, and the cost can be reduced. Further, when the program is to be read, since the program is read only with respect to the marking column corresponding to the identification code thus read, the time required for reading the program can be decreased. Furthermore, the program thus read is printed out in the setting mode confirming column so that the content or errors can be rechecked. In addition, the program read sensor has the function to read the ID code mark recorded on the time card. With all these features, the construction of the time recorder can be more simplified and the time recorder can exhibit more excellent performance. Accordingly, the program setting apparatus for a time recorder according to the present invention is most suited to be used as a time recorder which is used in small-sized offices, stores, shops, etc. having employees of 31 or less in total.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What is claimed is:

1. A program setting apparatus for a time recorder, the time recorder comprising (i) a memory and (ii) a printer for printing time-related data on a time card in accordance with a system program prestored in the memory and also with a user-specific setting program which is written in said time card after the time recorder is purchased, said program setting apparatus comprising:

a program setting card having a plurality of timing marks which are printed, side-by-side, on one edge of said time card in a vertical feeding direction, program setting mark marking columns being provided in a lateral direction with respect to said timing marks, respectively, for storing the setting program, an uppermost line of the mark marking columns formed on said setting card serving as an identification code column in which an identification code is preliminarily printed or marked;

sensor means, comprising a sensor mounted on said printer, for reading both the timing marks and setting program;

program read means, comprising a card transfer motor and a printer motor, for causing said printer to move laterally, column-by-column, along said mark marking columns while transferring, line-by-line, said setting card, so that said sensor reads the setting program;

storage means for writing the setting program thus read into said memory;

identification code read means for controlling the card transfer motor and the printer motor, when said sensor mounted on said printer has read the timing marks, to cause said sensor to read the identification code which is printed or marked in said identification code column on said uppermost line; and program read control means for controlling said card transfer motor and said printer motor so that said sensor reads only a portion of the setting program corresponding to a particular one of the mark marking columns which is related to said identification code, in accordance with the identification code thus read.

2. A program setting apparatus for a time recorder, the time recorder comprising (i) a memory and (ii) a printer for printing time-related data on a time card in accordance with a system program prestored in the memory and also with a user-specific setting program which is written in said time card after the time recorder is purchased, said program setting apparatus comprising:

a program setting card having a plurality of timing marks which are printed, side-by-side, on one edge of said time card in a vertical feeding direction, program setting mark marking columns being provided in a lateral direction with respect to said timing marks, respectively, for storing the setting program, the program setting card also being provided with a setting mode confirming column in which the setting program is printed item-by-item;

sensor means, comprising a sensor mounted on said printer, for reading both the timing marks and setting program;

program read means, comprising a card transfer motor and a printer motor, for causing said printer to move laterally, column-by-column, along said mark marking columns while transferring, line-by-line, said setting card, so that said sensor reads the setting program;

storage means for writing the setting program thus read into said memory; and program printing means for actuating said printer to print, item-by-item, the setting program read by said sensor in said setting mode confirming column of said setting card.

3. A program setting apparatus for a time recorder, the time recorder comprising (i) a memory and (ii) a printer for printing time-related data on a time card in accordance with a system program prestored in the memory and also with a user-specific setting program which is written in said time card after the time recorder is purchased, said program setting apparatus comprising:

a program setting card having a plurality of timing marks which are printed, side-by-side, on one edge of said time card in a vertical feeding direction, program setting mark marking columns being provided in a lateral direction with respect to said timing marks, respectively, for storing the setting program;

sensor means, comprising a sensor mounted on said printer, for reading both the timing marks and setting program;

program read means, comprising a card transfer motor and a printer motor, for causing said printer to move laterally, column-by-column, along said mark marking columns while transferring, line-by-line, said setting card, so that said sensor reads the setting program;

storage means for writing the setting program thus read into said memory;

first code determination means for reading, with the sensor, a mark which is marked in a column of the time card which indicates a number of days and determining the number of days indicated in said column which indicates the number of days, as an ID code of a card user; and second code determination means, comprising a back mark read sensor provided on a back side of a guide path for said time card, for reading the mark which is marked in the column of the time card which indicates the number of days and determining the number of days as the ID code of the card user, wherein:

an orientation of the time card determining which of the first and second code determination means is used.

* * * * *